United States Patent [19] [11] 3,931,393
Palilla [45] Jan. 6, 1976

[54] CATALYTIC PROCESS FOR REMOVING SULFUR DIOXIDE FROM GAS STREAMS

[75] Inventor: Frank C. Palilla, Framingham, Mass.

[73] Assignee: GTE Laboratories Incorporated, Waltham, Mass.

[22] Filed: Oct. 23, 1974

[21] Appl. No.: 515,114

[52] U.S. Cl................................. 423/570; 423/564
[51] Int. Cl.² ......................................... C01B 17/04
[58] Field of Search ........... 423/569, 570, 574, 564; 252/462

[56] References Cited
UNITED STATES PATENTS

| | | | |
|---|---|---|---|
| 2,361,825 | 10/1944 | Doumani | 423/564 |
| 3,752,877 | 8/1973 | Beavon | 423/564 X |
| 3,755,550 | 8/1973 | Stiles | 423/570 |
| 3,864,459 | 2/1975 | Stiles | 423/564 |

OTHER PUBLICATIONS

Voorhoeve et al.; "Science", Vol. 177, July 28, 1972, pp. 353–354.

*Primary Examiner*—G. O. Peters
*Attorney, Agent, or Firm*—Irving M. Kriegsman

[57] ABSTRACT

This application describes a process for the catalytic reduction of sulfur dioxide in gas streams containing sulfur dioxide to elemental sulfur using a reducing gas such as hydrogen or, preferably, carbon monoxide, and a catalyst of the formula $xLa_2O_3 \cdot yCo_2O_3$, where $x$ and $y$ are varied independently from 1–3 (including non-integers). Novel catalyst compositions where $x \neq y$ are also claimed.

23 Claims, 1 Drawing Figure

3,931,393

CATALYTIC PROCESS FOR REMOVING SULFUR DIOXIDE FROM GAS STREAMS

FIELD OF THE INVENTION

This invention relates to the removal of sulfur dioxide from gas streams containing sulfur dioxide. More particularly, this invention relates to the catalytic reduction of sulfur dioxide with a reducing gas, preferably carbon monoxide, to elemental sulfur in gas streams containing sulfur dioxide, such as flue or stack gases, gases resulting from oil or coal gasification which contain sulfur dioxide, smelter gases, etc.

BACKGROUND OF THE INVENTION

Sulfur dioxide is a constituent of many waste gases, such as, for example, smelter gases, flue gases, off gases from chemical manufacturing processes, ore roaster gases, and stack gases from coal- and oil-burning furnaces and boilers. Contamination of the atmosphere by sulfur dioxide, whether present in dilute concentrations of 0.05 to 0.3 volume percent as in power plant flue gases or in higher amounts of 5 to 10 percent as in ore roaster gases, has been a public health problem for many years due to its irritating effect on the respiratory system, its adverse affect on plant life, and its corrosive attack on many metals, fabrics and building materials. Millions of tons of sulfur dioxide are emitted into the atmosphere each year in The United States due to combustion of fuel oil and coal; a major amount of such sulfur dioxide being produced in the generation of electric power.

Since the reduction of the sulfur dioxide content of stack gases is the key to the production of useful energy from our abundant fuels (coal and high sulfur oil) in an environmentally acceptable manner, many methods have been proposed, and are presently under study, for the removal of sulfur dioxide from such gases. It is estimated that there are close to 50 sulfur dioxide removal processes presently under investigation in the United States. While the processes appear technically feasible, the expense of the sulfur dioxide removal is substantial. Some of the more common processes involve scrubbing of the stack gas and precipitation of the sulfur dioxide with limestone as calcium sulfite or, following oxidation, as calcium sulfate. Scrubbing of the very large effluent gas quantities, as well as collection and disposal of the solid precipitate from the scrubbing liquid, are expensive.

An inherently less expensive method for removing the sulfur dioxide is based on the catalytic reduction thereof with carbon monoxide or some other reductant. Neither scrubbing of a gas by a liquid nor the separation of a solid from a liquid are required in this method. This method has been tried with many different catalysts but, to date, to the best of Applicant's knowledge, such methods have one or more of three major difficulties. Initially, burners, such as those operated by electrical power generation, run on fuel mixes with excess air or "lean fuel mixes". This is done to prevent the formation of explosive carbon dust and to derive more energy from the fuel. As a result of the use of the lean fuel mix, the stack gas is rich in oxygen. This oxygen poisoned many of the catalysts tried in the past, thus killing the catalytic activity thereof and reducing the overall effectiveness of the reduction process. Secondly, certain of the catalysts utilized catalyzed the reduction of water by carbon monoxide to form carbon dioxide and hydrogen, or catalyzed the reaction of water and sulfur to hydrogen sulfide and oxygen. Hydrogen reacts with sulfur to form hydrogen sulfide at temperatures as low as about 200°C, and, thusly, in either case, the sulfur dioxide is converted into another toxic material. Thirdly, certain of the non-specific catalysts catalyzed the oxidation of carbon monoxide by sulfur to form carbonyl sulfide, another highly toxic gas. These difficulties arise because of the non-specific nature of the catalytic material.

OBJECTS OF THE INVENTION

It is, therefore, the primary object of this invention to define a novel process for the removal of sulfur dioxide from gas streams containing sulfur dioxide.

It is a further object of this invention to provide a process for the catalytic reduction of sulfur dioxide to elemental sulfur.

It is a further object of this invention to provide a process for the catalytic reduction of sulfur dioxide in gas streams containing sulfur dioxide to elemental sulfur using specific catalytic compositions which are not subject to poisoning by oxygen or water, and are less subject to the aforementioned deficiencies.

It is a further object of this invention to provide a process for the catalytic reduction of sulfur dioxide by a reducing gas to elemental sulfur, said process being sufficiently specific to operate with lean fuel mixtures while forming environmentally acceptable levels of sulfur dioxide, hydrogen sulfide, or carbonyl sulfide.

Yet a still further object of this invention is to provide novel catalytic compositions suitable for use in the processes of this invention.

These and still further objects, advantages and features of the present invention will become apparent upon consideration of the following detailed disclosure.

SUMMARY OF THE INVENTION

These and still further objects, features and advantages of the present invention are achieved, in accordance therewith, by utilizing a composition represented by the formula $xLa_2O_3 \cdot yCo_2O_3$, where $x$ and $y$ are independently varied from 1 to 3, inclusive (including non-integers), as the catalyst in the catalytic reduction of sulfur dioxide with a reducing gas, such as hydrogen or, preferably, carbon monoxide, in sulfurdioxide containing gas streams to elemental sulfur. $LaCoO_3$ which has a perovskite structure, is a known oxidation/reduction catalyst which has been used to reduce cis-2-butene in the presence of hydrogen (see Libby, SCIENCE, Vol. 171, pages 499–500, Feb. 5, 1971; and Pedersen and Libby, SCIENCE, Vol. 176, pages 1355–1356, June 23, 1972), and to oxidize carbon monoxide in the presence of oxygen to carbon dioxide (see Voorhoeve et al, SCIENCE, Vol. 177, pages 353–354, July 28, 1972). It was suggested in each of the aforementioned articles that $LaCoO_3$ should be tested as a potential auto exhaust catalyst. However, to the best of Applicant's knowledge, it has never been suggested to use $LaCoO_3$ as a catalytic material for the reduction of sulfur dioxide to elemental sulfur where a reducing gas such as carbon monoxide is added to the sulfur dioxide-containing gas stream. Indeed it has been reported that $LaCoO_3$ is poisoned by sulfur dioxide when $LaCoO_3$ is used as a catalyst for the conversion of CO to $CO_2$. See Yung-Fang Yu Yao, "The Oxidation of Hydrocarbons and CO over Metal Oxides," IV. Perovskite-Type Oxides, a paper presented at the 76th Annual Meeting of the American Ceramic Society, Paper No. 41 E 74, Apr. 30, 1974, Chicago, Illinois.

Although $LaCoO_3$ is a known catalytic material and corresponds to a formulation of $xLa_2O_3 \cdot yCo_2O_3$ where $x = y = 1$, the other catalystic compositions (i.e., where $x \neq y$) are presently considered to be novel preparations. Such preparations can be considered to be a $LaCoO_3$ phase in combination with one or more phases of excess $La_2O_3$ and/or oxides of cobalt, and/or other unidentified materials. It should be noted that the cobalt oxide used in the preparation of these materials actually exists as a mixture of $CoO$ and $Co_3O_4$, but this reagent grade cobalt oxide has a cobalt assay which corresponds to 101% $Co_2O_3$; accordingly, in this application the cobalt oxide will be considered to be $Co_2O_3$. Tests with such preparations have showed that the catalytic activity thereof compares favorably with $LaCoO_3$ notwithstanding the presence of excess $La_2O_3$ or $Co_2O_3$. This was surprising and quite unexpected since preparations where $x = 0$ ($Co_2O_3$) and $y = 0$ ($La_2O_3$) were also tested and found to be much less active than, for example, $LaCoO_3$. Since a dilution of the catalytic activity was expected because of the presence of the excess $La_2O_3$ or cobalt oxides phases (which had a lesser catalytic activity), the comparable catalytic activity actually found for the mixed phase preparations is considered to be surprising indeed. Since the Applicant believes these mixed phase preparations to be novel per se, it follows that, to the best of Applicant's knowledge, they have never been suggested for use as catalysts for the reduction of sulfur dioxide to elemental sulfur, especially where a reducing gas, such as carbon monoxide, is added to, or present in sufficient quantities in, the sulfur dioxidecontaining gas stream.

In its broadest aspects, the process of the present invention is directed to the removal of sulfur dioxide from any sulfur dioxide-containing gas stream where the above-identified catalyst is used and a reducing gas, such as hydrogen or, preferably, carbon monoxide, is added to, or present in sufficient quantities in, the sulfur dioxide-containing gas stream to within about ± 15%, generally about ± 10%, of the stoichiometric amount required for complete reduction of all sulfur dioxide present to elemental sulfur. If the amount of reducing gas in the stream is sufficient, no further amount need be added thereto. However, quantities of the reducing gas can be added, or generated in situ, as necessary to provide the desired amount of reductants, relative to oxidants, in the gas stream.

The first, and presently considered to be the most important aspect of the present invention is a process directed to the removal of sulfur dioxide from sulfur dioxide-containing flue or stack gases, especially those resulting from coal-burning processes, oil burning processes, or any other process which produces sulfur dioxide in the tail gas. Of special interest is the particularly severe case of a stack gas resulting from a coal-burning operation where the stack gas contains fly ash (to the extent not removed by precipitation) and generally has a composition of about 0.32% $SO_2$, 3.2% $O_2$, 15% $CO_2$, 7.6% $H_2O$, 0.12% nitrogen oxide, balance nitrogen, i.e., where the $O_2/SO_2$ ratio is about 10:1 and the $H_2O$ content is very high (which could lead to $H_2S$ formation), to which is added about 7.2% CO. Since the fly ash that remains and other components (including oxygen) of the gas stream do not "poison" the catalytic material of this process, it is effective to remove the sulfur dioxide as desired. It is contemplated that the catalyst will work even better with gas streams, such as those from oil burning operations, where the $O_2/SO_2$ ratio is more favorable and the level of fly ash is much lower.

In further aspects of the invention, the process of the present invention is considered applicable to other applications where the gas stream has a higher $SO_2$ content and a lower $O_2$ content, such as those gas streams resulting from ore roasting, coal processing plants where coal is converted to gas and/or oil, or scrubbing systems where absorbed sulfide is oxidized to $SO_2$ to give a concentrated $SO_2$-containing gas stream, etc. Typical gas concentrations contemplated here would be about 3–20% $SO_2$, 1–5% $O_2$, a few % $H_2O$, with the balance $N_2$. The $SO_2$ in such a gas stream would be catalytically reduced, as taught herein, to elemental sulfur and any $H_2S$ formed, even in appreciable amounts, could be recycled through the catalytic reactor. Such $H_2S$ formation would not be prohibitive since the bulk of the high concentration of the sulfur dioxide would be removed from the stream.

Reduction to elemental sulfur proceeds according to the known reactions:

$$SO_2 + 2CO \xrightarrow{\text{cat.}} S + 2CO_2 \qquad (I)$$

$$SO_2 + 2H_2 \xrightarrow{\text{cat.}} S + 2H_2O \qquad (II)$$

The important considerations in such processes relate to the reduction (and continued reduction) of the sulfur dioxide although oxygen, nitrogen oxides and other reducible components are present, the possible reduction of sulfur dioxide to hydrogen sulfide in the presence of water, the possible reduction to carbonyl sulfide by direct reaction between carbon monoxide and the sulfur dioxide, and the formation of hydrogen sulfide and carbon oxysulfide by reaction of the gaseous sulfur, produced in the principal reduction step, with other components present in the gas stream. In tests conducted to date with gas streams which have high $SO_2$ levels to which have been added or generated in situ carbon monoxide to increase the concentration thereof to not greater than the stoichiometric amount required to reduce all of the oxygen and sulfur present, it has been determined that the reduction of oxygen is favored over the reduction of sulfur dioxide (in the presence of oxygen), but the sulfur dioxide reduction is not excluded while oxygen is present; thus, in the presence or absence of oxygen, substantially complete reduction of the sulfur dioxide to elemental sulfur can be effected at temperatures below 700°C, generally between 450°C and 650°C; the presence of water at the elevated reaction temperatures does not lead to the formation of unacceptable hydrogen sulfide; and carbonyl sulfide is not formed in appreciable amounts in the reduction process (unless the feed gas contains carbon monoxide in concentrations greater than the stoichiometric amount required to reduce all of the oxygen and sulfur dioxide). In addition, in the presence of water, the formation of carbonyl sulfide is further inhibited. The present process, therefore, as it pertains to gas streams having high $SO_2$ levels, affords distinct advantages over known processes of which Applicant is aware since, in a single stage (though multiple stages are contemplated), with a temperature requirement of less than 700°C, the sulfur dioxide is converted to elemental sulfur with a conversion efficiency greater than about 90% while forming not greater than minimal quantities of carbonyl sulfide and, quite unexpectedly, producing only low levels of hydrogen sulfide under present operating conditions. This, in itself, is quite surprising since thermodynamic calculations of the equilibria for the reactions involved predict that very little reduction to elemental sulfur will occur. Therefore, the results, as set forth above, would not have been anticipated or expected.

Some hydrogen sulfide and/or carbon oxysulfide is formed with gas streams having low $SO_2$ and high water (>6%) concentrations, such as gas streams obtained with coal or oil-burning processes. However, the formation of such materials is within acceptable limits (considered to be much less than produced by other catalysts used for this purpose). In addition, activity of the catalyst is maintained for long periods of time, and the catalyst is resistant to poisoning by oxygen and functions in the presence of water vapor, thereby affording distinct advantages over other known catalysts used for the catalytic reduction of sulfur dioxide with a reducing gas.

In the essential aspects of the process of the present invention, the sulfur dioxide-containing gas stream is heated from the delivery temperature to a temperature in the range from about 450°C to about 700°C, or higher, if desired, and then, if necessary, mixed with additional carbon monoxide or hydrogen to provide a gaseous reaction mixture having the proper (or desired) stoichiometric balance between the reducing gas and the sulfur dioxide (and other reducible materials). Carbon monoxide in extreme excess (i.e. >10% over the stoichiometrically required amount) is to be avoided since it leads to the undesirable formation of carbonyl sulfide.

The sulfur dioxide/reducing gas gaseous stream is contacted with the catalyst of the present invention in a first converter wherein the sulfur dioxide is converted to elemental sulfur and the carbon monoxide is oxidized to carbon dioxide and/or the hydrogen is oxidized to water. The elemental gaseous sulfur which is formed is then condensed from the gas stream as the gases are cooled. If desired, the gas stream can be contacted with a second batch of catalyst in one or more further converters, after cooling to remove elemental sulfur (between each converter), to further increase the conversion efficiency of the processing system. Process parameters, materials of construction and type and size of necessary process equipment can be determined by application of those chemical and process engineering principles well-known in this field.

The catalyst is preferably treated with carbon monoxide at 700°C for about 15-45 minutes, generally about 30 minutes, at the desired flow rates of nitrogen and carbon monoxide. This preferred step, which can be, and generally is, conducted with the catalyst in place in the catalytic reactor(s), has been found to raise the catalytic activity of the catalyst to its desired maximum prior to the time when it is first contacted by the sulfur dioxide-containing gas stream. This ensures that the catalytic conversion efficiency will be at its highest even during the first few hours of contact, whereas, in contrast, without such a prereduction step, there is a definite time interval, on the order of hours, for the catalyst to reach maximum conversion efficiency for the given set of operating conditions. Thus, the prereduction step is desirable to ensure maximum conversion of sulfur dioxide to elemental sulfur at all times.

Satisfactory conversion rates have been obtained with space velocities through the catalytic reactor(s) on the order of 2,000–36,000 volumes of gas/volume of catalyst/hour, though both higher and lower space velocities, depending on the composition of the gas stream, are contemplated.

A particular advantage of the catalyst and process of this invention is that, upon temperature cycling from the desired operating temperature to a lower temperature followed by return to the desired operating temperature, the catalytic conversion returns to substantially the original conversion rate. Thus, if there is an emergency shut-down of the system or catalytic reactor(s), or other lowering of the temperature of the catalytic reactor(s), it does not become necessary to replace the catalytic material. Instead, when ready, the catalytic reactor(s) can be returned to the desired operating temperature and the catalytic material will perform substantially as well as before the temperature drop.

The catalyst of this invention can be pelletized by known techniques, such as by preparing an aqueous slurry, casting in the form of a thin sheet (⅛ inch thick) on an inert material, followed by drying and sintering at elevated temperatures. The sintered sheet is then broken into small pellets approximately ⅛ inch on an edge.

The catalyst of this invention can also be supported by known techniques as, for example, by impregnating a suitable carrier material with an aqueous solution thereof, and subsequently drying and calcining the impregnated material. Alternatively, the carrier material can be suitably loaded with the catalyst according to known dry impregnation techniques. Suitable carrier materials include, for example, zirconia, thoria, magnesia, alumina, silica-alumina, and the like, especially those having extended surface areas. After catalyst impregnation, the catalyst/support has more active sites per unit volume which promote sulfur dioxide reduction.

In an exemplary procedure, the carrier materials are sieved to −30/+60 mesh, and impregnated with aqueous solutions of lanthanum nitrate and cobalt nitrate, or other salts, such as, for example, acetates, oxalates, and carbonates, to form, upon firing, a carrier impregnated with about 5.5% $LaCoO_3$. In a further exemplary procedure, unstabilized zirconia powders or yttrium oxide-stabilized zirconia powders are mixed with lanthanum and cobalt nitrates to prepare aqueous suspensions. The suspensions are extruded as ⅛ inch diameter pellets, dried and then fired at temperatures between about 900°C and 1100°C, preferably at about 900°C to about 1000°C, to yield fired pellets having a nominal 5 wt. % $LaCoO_3$ composition. Auxiliary agents, such as binders, e.g., camphor, lubricating and wetting agents, etc. can be added to the suspension to improve the extrusion or pellet forming process.

Lanthanum cobalt oxide having high surface area has been prepared using a freeze drying technique. In this procedure, a stoichiometric mixture of solutions of soluble salts of lanthanum and cobalt are frozen, evaporated to remove the water and vacuum decomposed to produce lanthanum and cobalt oxides. This mixture can then be fired in air to produce the desired material. Similar techniques have been used to produce lanthanum cobalt oxides supported in zirconia.

Since the pressure drop across a pellet type fixed catalyst bed can be high and, therefore, will raise the operating cost of a catalytic reactor, honeycomb structures, such as cordierite honeycombs, can be used as supports for the catalytic material in the present invention as pressure drops therethrough are usually lower than with pellet type structures.

DETAILED DESCRIPTION

Figure 1:
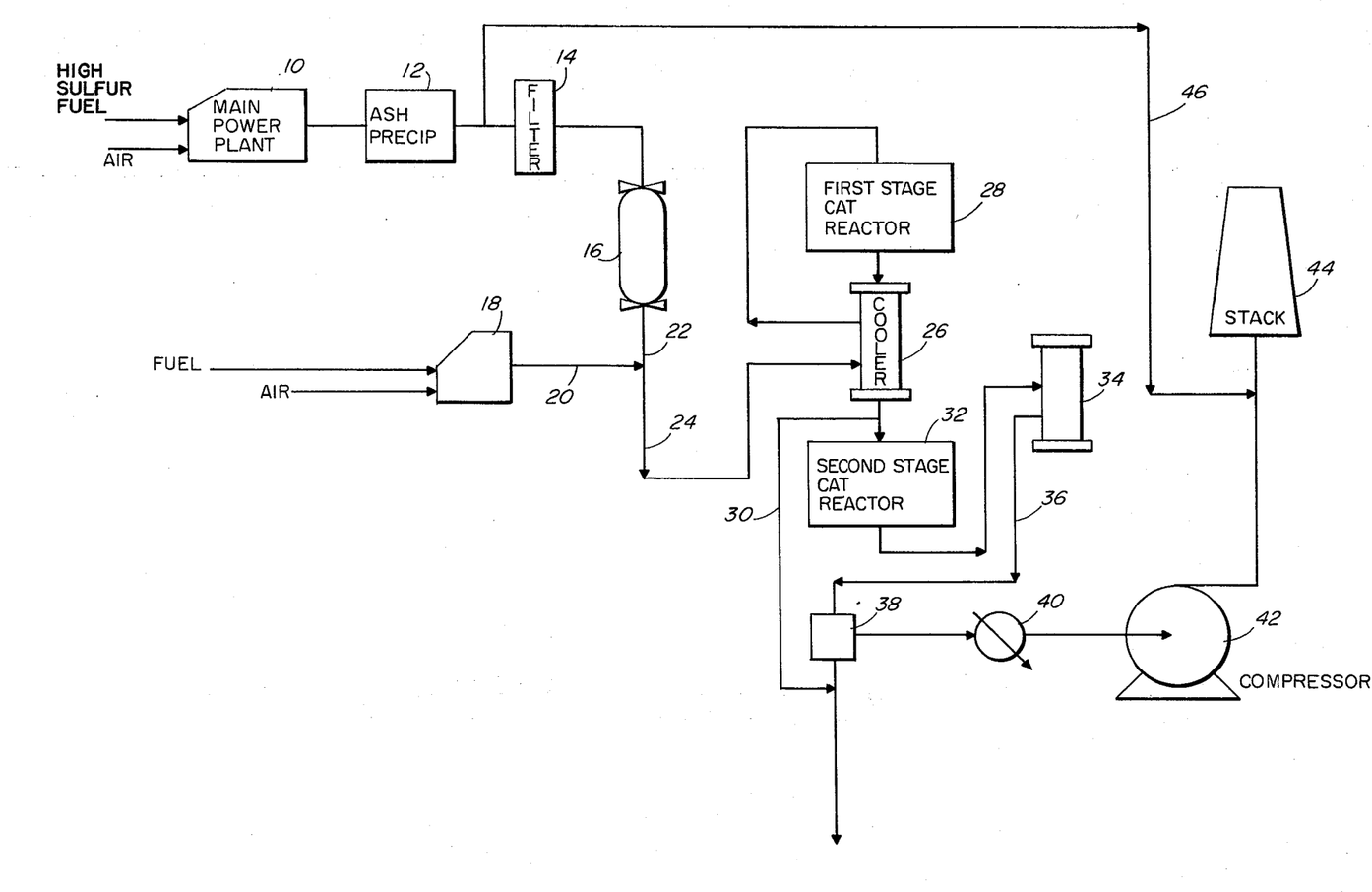
The sole FIGURE is a schematic flow diagram for the desulfurization of flue gases from a coal-burning power plant according to this invention.

Referring to the FIGURE there is shown a main power plant 10 wherein high sulfur content fuel is burned in the presence of air. A high temperature ash precipitator 12, for example an electrostatic precipitator, and, if necessary, other filtering means 14, are used to remove as much as possible (preferably all) of the particulate matter from the flue gas stream. If the flue gas stream contains excess hydrogen other than that limit considered desirable, a sacrificial catalyst can be utilized in catalytic reactor 16 to remove such hydrogen to prevent (or at least limit) the subsequent formation of hydrogen sulfide. A carbon monoxide generator 18, such as a coal or oil gasifier that may be as large as about 10% of the capacity of main power plant 10, is used to furnish the carbon monoxide needed to reduce the sulfur dioxide and oxygen. Generator 10 is connected via line 20 to the flue gas stream 22 exiting from catalytic reactor 16 or, if reactor 16 is unnecessary, to the flue gas stream exiting from filter means 14. The catalytic reactor, containing the catalytic material of this invention, may be in a single stage or in multiple stages if interstage cooling is required or where a second stage is required to improve the overall efficiency of the sulfur removal process. As shown, flue gas stream 24 containing sulfur dioxide, oxygen and carbon monoxide enters interstage cooler 26 and flows countercurrently to the gas stream exiting from first stage catalytic reactor 28. After the gas stream has passed through cooler 26, catalytic reactor 28 and then cooler 26 again, the sulfur formed in reactor 28 is removed (as at 30) from the flowing stream before the gas stream enters second stage catalytic reactor 32. Since the carbon monoxide reacts exothermically with at least a part of the oxygen present, it is advantageous to recover this heat in heat removal unit 34. The sulfur collected from the resultant gas stream 36 in sulfur recovery unit 38 is combined with the sulfur removed at 30 and used as a valuable by-product of this process. After the resultant gas stream passes through precipitator 40 and compressor 42, it is exhausted through stack 44. By-pass line 46 allows the gas stream to be directly exited via stack 44 to allow, for example, for catalyst replacement, emergency shutdown of the reactor system, etc.

DESCRIPTION OF SPECIFIC EMBODIMENTS

The following Examples are given to enable those skilled in this art to more clearly understand and practice the present invention. They should not be considered as a limitation upon the scope of the invention, but merely as being illustrative and representative thereof.

EXAMPLE I 6.517 Grams of $La_2O_3$ and 3.317 grams of $Co_2O_3$ which represents an excess over the 1:1 stoichiometric requirement of 0.057 g. of $Co_2O_3$ were dry blended for 3 hours in a ball mill at room temperature and placed into an uncovered platinum crucible. The sample was placed in a furnace at 200°C, the temperature raised to 500°C, and held there for 30 minutes. Then the temperature was raised to 1100°C and held there for 2 hours in air. The sample was allowed to cool to room temperature, ground with mortar and pestle, placed back in a platinum crucible, and re-fired in air at 1100°C for an additional two hours. The sample was again allowed to cool to room temperature, removed from the furnace, ground with mortar and pestle and sieved through a 325 mesh screen to yield 8.7 grams of perovskite $LaCoO_3$ with excess $Co_2O_3$.

EXAMPLE II 6.517 Grams of $La_2O_3$ and 3.26 grams of $Co_2O_3$ were dry ground and blended using a mortar and pestle, and fired in air at 1100°C for 4 hours in an uncovered platinum crucible. After the sample had been cooled to room temperature, it was removed from the furnace, re-ground with mortar and pestle, and refired at 1100°C for an additional 4 hours. After the second firing the sample was cooled, re-ground and sieved through a 325 mesh screen to afford perovskite $LaCoO_3$ (i.e., a 1:1 formulation of $La_2O_3 . Co_2O_3$).

EXAMPLE III

The procedure of Example II is repeated using 4.562 grams of $La_2O_3$ and 4.564 grams of $Co_2O_3$ to prepare $La_2O_3 . 2Co_2O_3$.

EXAMPLE IV

The procedure of Example II is repeated using 3.259 grams of $La_2O_3$ and 4.89 grams of $Co_2O_3$ to prepare $La_2O_3 . 3Co_2O_3$.

EXAMPLE V

The procedure of Example II is repeated using 6.517 grams of $La_2O_3$ and 1.63 grams of $Co_2O_3$ to prepare $2La_2O_3 . Co_2O_3$.

EXAMPLE VI

The procedure of Example II is repeated using 5.865 grams of $La_2O_3$ and 0.978 grams of $Co_2O_3$ to prepare $3La_2O_3 . Co_2O_3$.

EXAMPLE VII

−400 Mesh pre-synthesized $LaCoO_3$ (for example, as prepared in a manner similar to that of Example II) is mixed with deionized water in the ratio of about 10 g. of powder to 150 ml. of water. The resultant slurry is slip-cast onto ashless filter paper which is saturated with water. A vacuum is drawn on the opposite side of the filter paper to remove the supernatant liquid. After the excess water is removed, the cast cake is dried at 70°C for 17 hours while still on the filter paper. After drying, the cake/filter paper combination is fired in air at 900°C for 4 hours, followed by 100°C for 1 hour. The resultant body, 0.3 cm. thick, is diced into 0.3 cm. × 0.5 cm. rectangular pellets of pure $LaCoO_3$. In this example, the catalyst composition is in the configuration of a support where the catalyst material per se is both catalyst and carrier.

EXAMPLE VIII

One g. of −400 mesh pre-synthesized $LaCoO_3$ (for example, as prepared in a manner similar to that of Example II) is dry blended with 19 g. of yttrium oxide ($Y_2O_3$; 6%)-stabilized zirconia (Union Carbide Corp., New York, N.Y.). The mixture is combined with 8 ml. of deionized water to produce a paste which is extruded through a 0.32 cm. diameter orifice. The resultant extrudate is dried at 35°C for 17 hours, sliced to approximately 0.6 cm. lengths and fired at 900°C for 4 hours in air to provide yttrium oxide-stabilized zirconia pellets having nominal 5 wt. % $LaCoO_3$ as the catalytic material.

In a similar manner, substituting unstabilized zirconia for the yttrium oxide-stabilized zirconia, zirconia pellets having nominal 5 wt. % $LaCoO_3$ are prepared.

EXAMPLE IX

A solution of 9.80 g. of $La(NO_3)_2$ and 6.59 g. of $Co(NO_3)_2$ in 34 ml. of deionized water is added to 94.4 g. of $Y_2O_3$ (6%)-stabilized zirconia (sieved to −30/+60 mesh) to form a paste. The paste is extruded, dried, sliced and fired as set forth in Example VIII to provide $Y_2O_3$-stabilized zirconia pellets having about 5.5% $LaCoO_3$.

The procedure of the preceding paragraph is repeated with unstabilized zirconia, magnesia, alumina, and alumina-silica, respectively, to form catalytic pellets having about 5.5% $LaCoO_3$.

EXAMPLE X

In this example, which illustrates the catalytic activity of $LaCoO_3$ in reducing sulfur dioxide to elemental sulfur, six gases ($N_2$ saturated with $H_2O$, $N_2$, CO, $SO_2$, $O_2$ and $H_2$) are fed to a stainless steel manifold. From the manifold the gases pass through a mixing chamber, a 1 inch diameter, 18 inch long stainless steel tube filled with ¼ inch diameter glass balls, through a preheating zone where the temperature of the gas stream is raised to approximately that of the test reactor, and then to the test reactor, a 2 inch outer diameter tube furnace surrounding a ½ inch diameter, 18 inch long quartz tube having fitted joints at both ends. The catalyst, in this case the $LaCoO_3$ of Example I, sits in the reactor, 3 inches above the bottom of the furnace and is supported by a small amount of fiberfrax wool. The amount of catalyst used is 0.75 grams. The effluent from the test reactor goes into a sulfur collector, a 250 ml., 2 neck heated flask. Samples of the effluent are taken from the flask for analysis with a gas chromatograph.

At a furnace temperature of 600°C–720°C, with a flow of 12 ml./min. of $SO_2$ and 24 ml./min. of CO, the conversion efficiency to elemental sulfur is greater than 90%. Upon addition of 84 ml./min. or 298 ml./min. of $N_2$ to the gas stream at 680°C, the conversion efficiency remains about 90%.

At a furnace temperature of 700°C with a flow of 12 ml./min. of $SO_2$, 46 ml./min. of CO, 190 ml./min. of $N_2$ and 9 ml./min. of $O_2$, or 12 ml./min. of $SO_2$, 54 ml./min. of CO, 180 ml./min of $N_2$ and 9 ml./min. of $O_2$, with a contact time of about 0.2 second in each case, the conversion efficiency was about 100%.

At a furnace temperature of 700°C, after the catalyst had been on stream for 960 hours, with a flow of 12 ml./min. of $SO_2$, 24 ml./min. of CO, and 214 ml./min. of $N_2$, with a contact time of 0.2 second, conversion efficiency remained at about 100%.

At a furnace temperature of 700°C, after the catalyst had been on stream for 1900 hours, with a flow of 12 ml./min. of $SO_2$, 24 ml./min. of CO, 210 ml./min. of $N_2$ and 4 ml./min. of $H_2$, or 12 ml./min of $SO_2$, 24 ml./min. of CO, 194 ml./min. of $N_2$, 9 ml./min. of $O_2$, 6 ml./min. of $N_2$ saturated with $H_2O$, and 4 ml./min. of $H_2$, with a contact time of 0.2 second, conversion efficiency remains at about 100%.

The above conditions were continued, altering among the above and other conditions, up to a total of 3700 hours, at which time the testing was discontinued. Catalytic activity had not notably decreased throughout that time.

EXAMPLES XI – XXIV

In the following Examples, XI – XXIV, a screening reactor system (described below) has been utilized to test the relative catalytic activity of the materials embraced by this invention. The system has been set to give a conversion efficiency of about 60% (instead of 100%) with $LaCoO_3$, thereby enabling the detection of still more effective catalyst compositions.

Three gases ($N_2$, CO, and $SO_2$) are fed to a stainless steel manifold. From the manifold the gases pass through a ⅜ inch diameter, 12 inches long, 21 element stainless stell static mixer (Kenics Corp., Danvers, Mass.) then to a reactor which consists of a 15 inch tube furnace surrounding a 178 inch diameter, 18 inch long quartz tube having fitted joints at both ends. The catalyst sits in the reactor 4 inches above the bottom of the furnace and is supported by a small amount of fiberfrax wool. The amount of catalyst used is 0.5 grams. The effluent from the reactor system goes into a sulfur collector, a ½ inch diameter, 8 inch long pyrex tube with fitted joints at both ends. A ¼ inch tube leads to a ¼ inch stainless steel millipore filter. From the filter, the effluent passes to a Carle Automatic Sampling Valve and timer which injects samples every 10 minutes into a gas chromatograph.

The data for various catalytic compositions embraced by this invention with flow rates of 12 ml./min. of $SO_2$, 24 ml./min. of CO, and 84 ml./min. of $N_2$ (catalyst volume = 0.59 cm³; contact time = 0.29 second) is tabulated in Table I below.

TABLE I

| EXAMPLE | FORMULA | STARTING MATERIALS | FIRING; TEMPERATURE AND TIME | X-RAY ANALYSIS OF CATALYST COMPOSITION | TEMPERATURE AT WHICH NO REACTION OCCURS | MAXIMUM COS PRODUCTION AT LOW TEMP. | % $SO_2$ REMOVED AT 700°C |
|---|---|---|---|---|---|---|---|
| XI | $LaCoO_3$ | $La_2O_3$ $Co_2O_3$ | See EX. I | perovskite; some $La(OH)_3$ detected | 420°C | 14% | 77% |
| XII | $LaCoO_3$ | $La_2O_3$ $Co_2O_3$ | 1100°C for 8 hours; reground after 4 hours | perovskite; some $La(OH)_3$ detected | 440°C | 6% at 490°C | 63% |
| XIII | $LaCO_3$ | $La_2O_3$ | 1100°C for 8 | perovskite; slight | 410°C | 10% at | 67% |

TABLE I-continued

| EXAMPLE | FORMULA | STARTING MATERIALS | FIRING; TEMPERATURE AND TIME | X-RAY ANALYSIS OF CATALYST COMPOSITION | TEMPERATURE AT WHICH NO REACTION OCCURS | MAXIMUM COS PRODUCTION AT LOW TEMP. | % $SO_2$ REMOVED AT 700°C |
|---|---|---|---|---|---|---|---|
| | | $Co_2O_3$ | hrs.; reground after 4 hours | excess of $Co_2O_3$ | | 450°C | |
| XIV | $LaCO_3$ | $La_2O_3$ $Co_2O_3$ | 1100°C for 8 hrs.; reground after 4 hours | perovskite; no excess $Co_2O_3$ | 370°C | — | 64% |
| XV | $LaCO_3$ | nitrates | 1100°C for 16 hrs.; reground after 4 & 12 hours | perovskite; some $La_2O_3$ and $Co_3O_4$ detected | 450°C | 5% at 480°C | 57% |
| XVI | $La_2O_3 \cdot Co_2O_3$ | oxides | See Ex. II | | 490°C | 18% at 510°C | 58% |
| XVII | $La_2O_3 \cdot 2Co_2O_3$ | oxides | See Ex. III | primary $LaCoO_3$; secondary $Co_3O_4$ | 500°C | Trace | 57% |
| XVIII | $La_2O_3 \cdot 3Co_2O_3$ | oxides | See Ex. IV | primary $LaCoO_3$; secondary $Co_3O_4$ | 480°C | 7% at 540°C | 55% |
| XIX | $2La_2O_3 \cdot Co_2O_3$ | oxides | See Ex. V | primary $LaCoO_3$; secondary $La_2O_3$ | 500°C | 5% at 410°C | 56% |
| XX | $3La_2O_3 \cdot Co_2O_3$ | oxides | See Ex. VI | primary $LaCoO_3$; secondary $La_2O_3$ | 480°C | 4% at 480°C | 56% |
| XXI | $LaCoO_3$ | oxides | 1100°C for 4 hrs.; reground after 2 hrs.; air quenched | | 500°C | 28% | 64% |
| XXII | $LaCoO_3$ | oxides | 1100°C for 4 hrs.; reground after 2 hrs.; oven-cooled | | 470°C | Present | 64% |
| XXIII | $LaCoO_3$ | oxides | 1100°C for 4 hrs.; reground after 2 hrs.; oven-cooled | | 460°C | 13% | 65% |
| XXIV | $LaCoO_3$ | oxides | 1100°C for 4 hrs.; air quenched | | 470°C | 11% | 64% |

By way of comparison, one sample of $Co_2O_3$ removed 60% $SO_2$ at 700°C, but the conversion rate decreased rapidly with decreasing temperature, e.g., at 690°C the conversion had decreased to 20%. A second sample removed only 27% at 700°C, while a third sample removed only 5% at 700°C, and a sample of $La_2O_3$ removed only 43% at the same temperature. Thus, from this data, one would not expect that combinations of $LaCoO_3$ with either excess $Co_2O_3$ or $La_2O_3$ would be as effective as they unexpectedly are, as shown above.

EXAMPLES XXV – XXXII

In the following Examples XXV – XXXII, a more elaborate reactor system (which permits the synthesis of gas compositions which closely simulate stack gases) is utilized. Eight gases ($N_2$, CO, $SO_2$ in $N_2$, NO or NO in $N_2$, $O_2$, $H_2$, $CO_2$ and $CH_4$) are fed to a stainless steel manifold. From the manifold the gases pass through a 1 inch diameter, 18 inch long stainless steel tube, filled with ¼ inch diameter glass balls, which serves as a mixing chamber, then to a water injection zone consisting of a Sage Model 341 syringe pump having a 10 ml. plastic syringe connected to the system via a ⅛ inch polyethylene line. After the water injection zone, the gases flow through an inverted, heated, U-shaped glass tube which leads directly to the reactor, a 15 inch tube furnace surrounding a ½ inch diameter, 18 inch long quartz tube having fritted joints at both ends. The catalyst sits in the reactor 4 inches above the bottom of the furnace and is supported by a small amount of fiberfrax wool. The amount of catalyst used is 0.5 grams of unsupported material or 1.5 grams of supported material. The effluent from the reactor goes into a sulfur collector, a 250 ml. 2-neck flask. Samples of effluent are taken from the flask by syringe for analysis with a gas chromatograph.

Reaction conditions are not optimal, but were chosen such that small changes in the incoming gases would effect large changes in the products. Flow rates are set such that the reactor is not able to effect maximum conversion. This affords greater flexibility in determining the effect and different reaction parameters, as varied, upon the product stream.

The $O_2/SO_2$ ratio is maintained constant at 8.0/0.8 = 10. Total reductants ($H_2$, CO, $H_2S$, and $CH_4$) to oxidants ($O_2$ and $SO_2$) is maintained constant at 18/8.8 = 2.04, or just above stoichiometric requirements. For examples not containing $H_2O$ in the feed stream, the $N_2$ flow rate is increased by 18 ml./min. to keep the overall feed flow rate constant. No adjustment in the overall feed flow rate is made when 0.3 ml./min. of NO is added to the feed stream.

EXAMPLE XXV

The catalyst is pelletized $LaCoO_3$ prepared according to the procedure of Example VII except the dried cake is fired at 1100°C for 1 hour before being diced into pellets. The feed is 50 ml./min. of 1.6% $SO_2$ (about 3243 ppm), 114 ml./min of $N_2$, 8.0 ml./min. of $O_2$, 38 ml./min. of $CO_2$ (about 15%), 18.7 ml./min. of $H_2O$ (about 7.6%) and 18 ml./min. of CO (about 7.2%). Reactor temperature is 700°C. After passage through the reactor, 400 ppm $SO_2$, 0.2% $O_2$, and 0.25% CO remain, and 850 ppm $H_2S$ and 400 ppm COS are formed. This corresponds to an $SO_2$ conversion of about 85%; decreasing the flow rate (equivalent to increasing the contact time) to 227 ml./min. by decreasing the $N_2$ flow rate increases the conversion to 91%.

EXAMPLE XXVI

Example XXV is repeated except no water is added and the nitrogen flow rate is increased to 132 ml./min. After passage through the reactor, 380 ppm $SO_2$, 0.08% $O_2$ and 0.1% CO remain, and less than 20 ppm $H_2S$ and only a trace of COS is formed.

EXAMPLE XXVII

Example XXV is repeated except that the CO flow rate is decreased to 9 ml./min., the $N_2$ flow rate is decreased by 57 ml./min., and 9.0 ml./min. of $CH_4$ and 57 ml./min. of 0.53% NO in $N_2$ (equivalent to 0.3 ml./min. of NO; 1222 ppm NO) are added to the feed stream. After passage through the reactor, 100 ppm $SO_2$, 2.1% $CH_4$, 0.06% $O_2$, and a trace of CO remain, and 100 ppm $H_2S$ and 42 ppm COS are formed. $SO_2$ conversion efficiency is about 97%.

EXAMPLE XXVIII

Example XXV is repeated except the yttrium oxide stabilized zirconia - $LaCoO_3$ pellets of Example VIII are utilized as the catalyst material. After passage through the reactor, 366 ppm $SO_2$, 0.08% $O_2$ and 0.25% CO remain, and 1300 ppm $H_2S$ and 190 ppm COS are formed.

EXAMPLE XXIX

Example XXVIII is repeated except 0.3 ml./min. (~1200 ppm) of NO are added to the feed stream. After passage through the reactor, 250 ppm $SO_2$, 0.10% $O_2$ and 0.25% CO remain, and 1300 ppm $H_2S$ and 160 ppm COS are formed. This Example and Examples XXVII and XXXI show that the addition of NO assists in the reduction of $SO_2$.

EXAMPLE XXX

Example XXVIII is repeated except the flow of CO is decreased to 9 ml./min., and 9 ml./min. of $H_2$ are added to the feed stream. After passage through the reactor, 190 ppm $SO_2$ and 0.10% $O_2$ remain, and 1300 ppm $H_2S$ and 100 ppm COS are formed. This run shows that $H_2O$ hinders the formation of COS.

EXAMPLE XXXI

Example XXX is repeated except 0.3 ml./min. (~1200 ppm) of NO are added to the feed stream. After passage through the reactor, 94 ppm $SO_2$, 0.08% $O_2$ and 0.45% CO, and 1200 ppm $H_2S$ and 120 ppm COS are formed. This Example and Examples XXVII and XXIX show that the addition of NO assists in the reduction of $SO_2$.

EXAMPLE XXXII

Example XXVIII is repeated except no water is added and the nitrogen flow rate is increased to 132 ml./min. After passage through the reactor, 165 ppm $SO_2$ and 0.10% $O_2$ remain, and 1200 ppm $H_2S$ and 300 ppm COS are formed. In comparison with Example XXX, this run shows that the presence of water hinders the formation of carbonyl sulfide. The run also shows that $H_2$ is an effective reductant, but also causes the formation of $H_2S$ with this supported catalyst.

EXAMPLE XXXIII

In this Example, a reactor system is utilized in conjunction with a coal-burning stove to test the effect of the fly ash from the coal on the catalysts. A portion of the flue gases from the stove were drawn off through a 1 inch diameter stainless steel line to which the reductant (CO) was introduced. In addition, since the $SO_2$ produced from the burning of the coal was below the amount normally expected, additional $SO_2$ was also injected at this point. The gas stream is then passed through an ash filter to remove a portion of the particulate matter, and then through a stainless steel mixing tube to ensure a homogeneous gas mixture. The catalyst is placed in a reactor tube heated by a 20 inch Lindberg tube type furnace which maintains the catalyst bed at the desired temperature. The sulfur which is produced in the catalytic reactor is condensed out in a trap just below the furnace. The system also has gas sampling ports before and after the reactor, and after the sulfur trap, for obtaining gas samples for analysis. Four catalyst compositions [$LaCoO_3$ on $\omega$-$Al_2O_3$, $LaCoO_3$ on Norton SA-3232($Al_2O_3$ + $SiO_2$), and pelletized $LaCoO_3$ (two different samples)] were tested for catalytic conversion in the reactor system before passing flue gases over the catalyst to determine initial activity. The coal stove was then run for 1 week, and the conversion efficiency tested again. Finally, samples of fly ash from the flue are ground together with a small portion of stove ash and unburned coal, and added directly to the top of the catalyst bed, and the conversion efficiency tested again. In all cases, the reduction of $SO_2$ was greater than 90% both before and after the poisoning attempts, and no loss in catalytic efficiency was obtained. Large amounts of $H_2S$ and COS were formed with the $LaCoO_3$ on the $Al_2O_3$ + $SiO_2$ support, probably because of the formation of $CoAl_2O_4$ on the catalyst surface by reaction with the support material. For this reason, $Al_2O_3$ + $SiO_2$ is not a preferred support. Flow rates for these tests were 1538 ml./min. of $N_2$, 17.6 ml./min. or 24.5 ml./min. of $SO_2$ and CO as required for stoichiometric balance with $O_2$ and $SO_2$. Some $H_2O$ is always present, usually about 0.5–1.0%.

In certain instances where the said gas stream has a composition different from that set forth above or used in the Examples, the catalytic conversion efficiency may be on the order of 80% or so. However, under appropriate conditions and with properly constituted gas streams, conversion efficiencies on the order of 90% can be obtained.

While the present invention has been described with reference to specific embodiments thereof, it should be understood by those skilled in this art that various changes may be made and equivalents may be substituted without departing from the true spirit and scope of the invention. In addition, many modifications can be made to adapt a particular situation, material or composition of matter, process, process step or steps, or then-present objective to the spirit of this invention without departing from its essential teachings.

What is claimed is:

1. A process for removing sulfur dioxide from a gas stream containing sulfur dioxide comprising passing a gas stream containing sulfur dioxide and a sufficient amount of carbon monoxide and/or hydrogen to reduce at least a portion of said sulfur dioxide to elemental sulfur through a reaction chamber containing a material $x$ $La_2O_3$ . $y$ $Co_2O_3$, where $x$ and $y$ are varied independently from 1 to 3, inclusive, to catalytically produce at a sufficiently elevated temperature a product stream comprising elemental sulfur and carbon dioxide or water, and thereafter removing said elemental sulfur from said product stream.

2. The process of claim 1 wherein said gas stream is heated to a temperature in the range from about 450°C to about 700°C.

3. The process of claim 1 wherein said material is $LaCoO_3$.

4. The process of claim 1 wherein $x \neq y$.

5. The process of claim 1 wherein said process is characterized by a sulfur dioxide to sulfur conversion efficiency greater than about 90%.

6. The process of claim 1 wherein said process is characterized by a sulfur dioxide to sulfur conversion efficiency greater than about 90% even after prolonged exposure to substantial proportions of oxygen in said heated gas stream.

7. The process of claim 1 wherein the production of said product stream proceeds even in the presence of substantial percentages of oxygen in said heated gas stream.

8. The process of claim 1 wherein not greater than minimal amounts of hydrogen sulfide and carbonyl sulfide are contained in said product stream.

9. The process of claim 1 wherein said carbon monoxide or hydrogen in said gas stream is in an amount not greater than the stoichiometric amount thereof required for reduction of all oxidants in said gas stream.

10. The process of claim 1 wherein said carbon monoxide or hydrogen in said gas stream is within ± 15% of the stoichiometric amount required for complete reduction of all oxidants in said gas stream.

11. The process of claim 1 wherein a portion of said carbon monoxide or hydrogen in said gas stream is generated in situ.

12. The process of claim 1 wherein a portion of said carbon monoxide or hydrogen in said gas stream is added thereto from an external source.

13. A process for removing sulfur dioxide from a gas stream containing sulfur dioxide comprising adding carbon monoxide to a gas stream containing sulfur dioxide and oxygen to thereby provide a gaseous reaction stream, the total amount of carbon monoxide in said gaseous reaction mixture being approximately the stoichiometric amount required for reduction of all of said oxygen and said sulfur dioxide in said gaseous reaction stream, heating said gaseous reaction stream to a temperature in the range from about 450°C to about 700°C, passing said heated gaseous reaction stream through at least one reaction chamber containing a material represented by the formula $xLa_2O_3 \cdot yCo_2O_3$, where $x$ and $y$ are varied independently from 1 to 3, inclusive, to catalytically produce a product stream comprising elemental sulfur, carbon dioxide, and not greater than minimal quantities of hydrogen sulfide and carbonyl sulfide, the sulfur dioxide to sulfur catalytic conversion efficiency being greater than about 90%, and thereafter removing said elemental sulfur from said product stream.

14. The process of claim 13 wherein said material is $LaCoO_3$.

15. The process of claim 13 wherein $x \neq y$.

16. The process of claim 13 wherein said catalytic conversion efficiency is not substantially adversely affected even after prolonged exposure of said catalytic material to said oxygen in said gaseous reaction stream.

17. The process of claim 13 wherein said carbon monoxide in said gaseous reaction stream is within ± 15% of the stoichiometric amount required for complete reduction of all oxidants in said gaseous reaction stream.

18. The process of claim 1 wherein said material is supported on a magnesia carrier.

19. The process of claim 13 wherein said material is supported on a magnesia carrier.

20. The catalytic material of claim 18 wherein said catalytic material is supported on a magnesia carrier.

21. The process of claim 1 wherein said material is supported on a zirconia carrier.

22. The process of claim 13 wherein said material is supported on a zirconia carrier.

23. The process of claim 1, wherein the elevated temperature is in the range from about 450°C. to about 700°C.

* * * * *

PO-1050
(5/69)

UNITED STATES PATENT OFFICE
CERTIFICATE OF CORRECTION

Patent No. 3,931,393     Dated January 6, 1976

Inventor(s) Frank C. Palilla

It is certified that error appears in the above-identified patent and that said Letters Patent are hereby corrected as shown below:

Column 3, line 5, delete "catalystic" and insert --catalytic--

Column 10, line 37, delete "stell" and insert --steel--

Column 10, line 39, delete "178" and insert --½"--

Column 16, lines 35 and 36, delete Claim 20 in its entirety

Signed and Sealed this

Twenty-first Day of September 1976

[SEAL]

Attest:

RUTH C. MASON
*Attesting Officer*

C. MARSHALL DANN
*Commissioner of Patents and Trademarks*